July 23, 1957     W. S. MILLER     2,800,177
PRODUCTION OF FUSED SALTS FROM AQUEOUS SOLUTIONS THEREOF
Filed Nov. 2, 1950
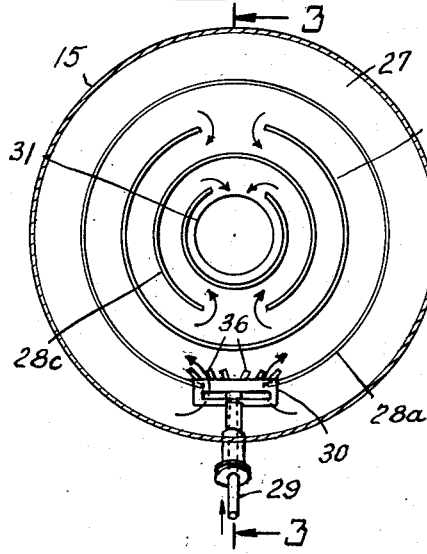
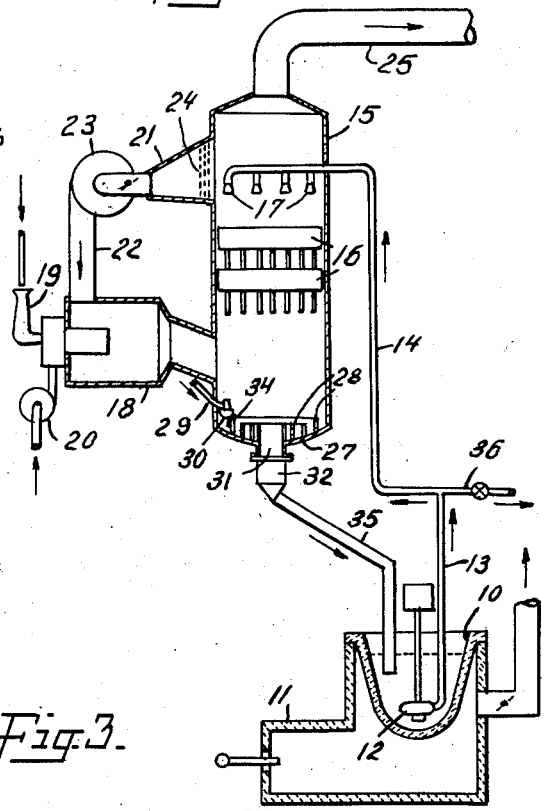
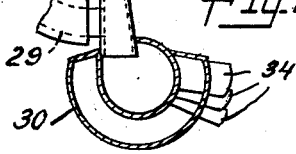
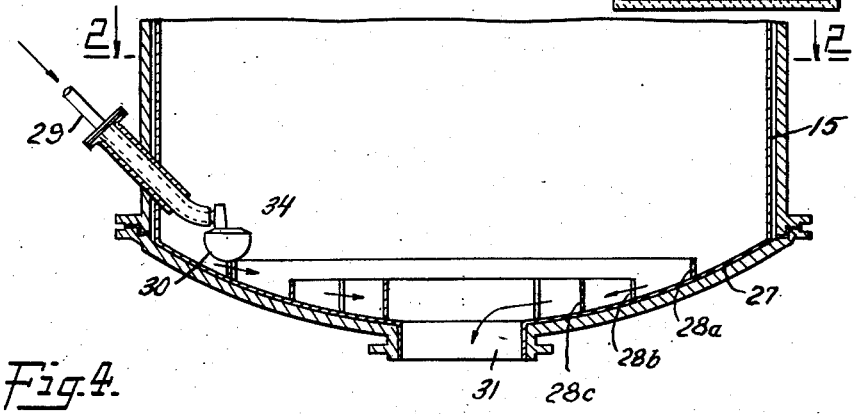
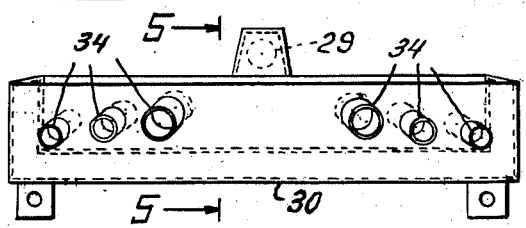
INVENTOR
W. STANDISH MILLER
BY
Adams, Forward and McLean
ATTORNEYS

United States Patent Office 2,800,177
Patented July 23, 1957

2,800,177

PRODUCTION OF FUSED SALTS FROM AQUEOUS SOLUTIONS THEREOF

Warren Standish Miller, Houston, Tex., assignor to Olin Mathieson Chemical Corporation, a corporation of Virginia Application November 2, 1950, Serial No. 193,638

2 Claims. (Cl. 159—49)

My invention relates to improved means for producing fused anhydrous salts directly from their aqueous solutions in a procedural system which provides for efficiently and safely contacting the aqueous salt solution with a superheated circulating melt of the fused anhydrous salt so that the excess heat of the melt is used to completely dehydrate the aqueous solution while the melt is retained in substantially anhydrous and fused state at all times.

It is often highly desirable to convert aqueous salt solutions directly to fused anhydrous form so that the salt can be cast or molded in the form of briquets or tables, or can be sprayed into the form of small solid granules or prills. For example, the form of sodium nitrate in greatest commercial demand is the prilled product which is made by spraying molten sodium nitrate in a prilling tower where the sprayed droplets cool and solidify in falling, and the resulting small pellets or prills are collected as a non-caking, readily handled and packaged product. In this country, however, sodium nitrate is commonly produced by neutralizing nitric acid with soda ash, sodium bicarbonate or caustic soda. Hence the material domestically produced is in aqueous solution and as an article of commerce must be reduced to a solid state by crystallization. The necessary steps of evaporation, cooling, crystallization, filtration and drying are economically burdensome, particularly when the material is to be produced or handled in fused form.

The direct reduction of an aqueous salt solution to fused anhydrous state however is considered a hazardous operation in the art. For example, the addition of a stream of aqueous solution to a pot or pool of fused nitrate or caustic results at the temperature involved in a reaction that is almost explosive in its violence. In addition, contact between a relatively cool aqueous stream and a fused salt creates serious handling problems with regard to troublesome solidification and plugging. In the case of many salts such as sodium nitrate, the problem is further complicated by sensitivity to thermal decomposition at temperatures in the proximity of the melting point. Thus sodium nitrate fuses at 308° C. but is heat sensitive and begins to decompose to sodium nitrite at an appreciable extent when the temperature equals 380° C. Consequently, temperature and/or time of heating must be carefully controlled. Accordingly, the art has considered it necessary to first separate the solid salt from aqueous solution by evaporation and cooling followed by separation of the crystals from the mother liquor. The crystals are then dried in a separate operation before melting to produce the fused anhydrous salt.

According to my invention, a safe efficient and convenient system is provided for producing fused anhydrous salts directly from an aqueous solution by superheating a circulating melt of the fused salt in a heating zone. The salt is melted under conditions avoiding decomposition through excessive temperature, and a stream of the melt is circulated and rapidly superheated in the heating zone so that time at decomposition temperature is minimized and heat requirements are reduced. The superheated melt is passed to a mixing zone where it is distributed over a surface of relatively large area in the form of a shallow stream or thin film. The shallow stream is flowed in a serpentine path to a drain opening and the aqueous feed solution to be dehydrated is added to the flowing shallow stream of melt at a distance from the drain opening which permits intimate admixture and complete dehydration time. Advantageously, the mixing surface constitutes a circular pan or tray at the foot of a superheating column and is baffled in such a way as to direct the flow of the shallow stream of melt in concentrically circulating paths to a centrally located drain opening. The addition of the aqueous feed solution is controlled in amount according to the net make of fused anhydrous salt, the circulation ratio and the heating conditions in order to maintain the system in a steady state and in thermal balance. Steam flashed in the dehydration operation is removed from the mixing zone and the effluent melt from the mixing zone comprising fused and dehydrated feed and cooled circulating fused salt is returned to the melting zone for recirculation. The net make of fused anhydrous material can be withdrawn at any desired point. The present method of contacting the superheated melt and the aqueous salt solution is an improvement over that of my copending application Serial No. 193,637, filed November 2, 1950, now U. S. Patent 2,643,180.

The process steps and methods of handling the materials involved in typical application of my invention, e. g., production of sodium nitrate in fused anhydrous form, are illustrated in Figure 1 of the accompanying drawings. The equipment is shown schematically and in partial section. Figures 2 to 5 indicate details of equipment useful for accomplishing the method of my invention.

In Figure 1 of the drawing, fused sodium nitrate is circulated from melting pot 10 which is heated by a conventionally fired heater 11. The circulating melt is lifted by pump 12 through lines 13 and 14 to an upper portion of packed or baffled tower 15. As shown, the tower is fitted with vertical slat packing 16 which has the advantages of low pressure drop and clean drainage. The circulating melt is distributed over the packing by a system of nozzles 17 or by any appropriate distribution system such as a set of weir boxes with drain spouts, distributing nozzles and splash plates.

The baffled tower 15 provides a superheating zone in which the descending droplets of fused sodium nitrate may be directly heated by countercurrent contact with hot gases produced in gas fired, roto-louvre type air heater 18. Fuel gas is supplied to the heater through burner 19 and air by fan 20. The bulk of the hot gases advantageously are recirculated through ducts 21 and 22 by means of fan 23. Spray baffles 24 are provided at the head of duct 21 to knock out entrained droplets of sodium nitrate. Excess gases together with steam from the dehydration step are vented through duct 25 to the stack.

The superheated melt rains down onto circular tray 27 and drains centrally and downwardly as a shallow stream or thin flowing film of melt in a serpentine or concentrically circulating path defined by baffles 28. The aqueous feed solution, advantageously in concentrated form and at a temperature avoiding crystallization, is charged to the flowing shallow stream of melt on tray 27 through connection 29 and weir box distributor 30.

Referring to Figures 2 and 3, it can be seen that weir box 30 is mounted over the entrance to the first baffle 28a so as to obtain intimate admixture with the stream of melt flowing centrally and downwardly around baffle 28b to the oppositely disposed entrance to the next lower section defined by baffle 28c. The shallow stream of melt then flows through another oppositely disposed passageway and then downwardly through the centrally situated drain opening 31 into sump 32.

By reference to Figures 4 and 5, the operation of a weir box distributor 30 can be followed. The distribution of the aqueous feed over the shallow stream of melt is advantageously obtained by the weir box distributor although nozzles or other distributors can be employed. The weir box is equipped as shown with six drain spouts 34 which are angularly disposed in the weir box to accomplish broad distribution and which are of differing orifice size and level in order to accommodate feed fluctuations. The relatively cool melt draining into sump 32 is returned to melting pot 10 through line 35. Net make of the fused anhydrous salt may be withdrawn through valved line 36 as to a prilling operation.

In the operation of my invention, a temperature above the melting point of the salt is maintained in the melting pot 10, e. g. about 350° C. for sodium nitrate, and a temperature sufficiently high to dehydrate and fuse the feed is obtained in the superheating column 15, e. g. about 385° C. for sodium nitrate. In the case of sodium nitrate, the superheating advantageously is accomplished by direct contacting with heating gases at about 500° to 700° C. In the case of a material such as caustic soda however which reacts with the oxides of carbon in the flue gases, indirect heating is employed. The equipment is constructed of materials that will withstand attack by the process materials under the temperature conditions employed. Thus cast iron is used for the contact surfaces in handling sodium nitrate and the use of ceramic materials is avoided. Graphite advantageously is employed in the mixing zone in handling caustic soda so that the usual problem of metal contamination associated with the handling of highly concentrated aqueous solutions of caustic is obviated.

My invention provides a safe and highly efficient system for directly reducing aqueous salt solutions to fused anhydrous state. The contact system provides flexibility in control and prolonged contact time for intimate admixture and complete dehydration. The complete mixing and dehydration provided before the melt leaves the mixing zone avoids troublesome crystallization and plugging difficulties in the subsequent cooler portions of the equipment. The shallowness of the stream of melt and the controlled distribution of the feed provide safety by preventing formation of steam below the surface of the melt while promoting intimate, rapid admixture and heat transfer. The system has the advantage of providing maximum surface to effect quick, uniform heat transfer avoiding even momentary solidification while rapidly dissipating the excess heat in the superheated melt. In addition, pressure drop is minimized so that rapid, uniform and complete dehydration is obtained, and tower overloading with steam is avoided. Heat requirements are lowered and danger of decomposition is minimized by the rapid superheating of only a portion of a circulating melt and by utilizing the aqueous feed to return the circulating melt to the starting temperature. Thermal requirements are further minimized by the low circulation ratios required, e. g. about 2 or 3:1.

I claim:
1. In a process for the production of water soluble salts which have a stable molten anhydrous state at temperatures above the boiling points of their aqueous solutions in which a circulating melt of the fused salt is superheated to a temperature above the boiling point of the aqueous solution of the salt at which the fused salt is stable in a heating zone and passed to a mixing zone wherein an aqueous solution of the salt in added to the circulating melt of fused salt and from which mixing zone flashed steam is removed and cooled melt is withdrawn, the improvement which comprises distributing the superheated melt in the mixing zone in the form of a shallow layer over a surface of relatively large area with the depth of the layer being sufficiently shallow to prevent below the surface of the melt the formation of steam produced by contacting the superheated melt with the aqueous salt solution, flowing the shallow stream in concentrically circulating paths across said surface to a central drain opening, and adding the said aqueous salt solution to the flowing shallow stream of melt in the mixing zone at a distance from the drain opening permitting intimate mixing and adequate dehydration time and in controlled amounts to provide substantial dehydration of the aqueous salt solution.

2. In a process for the production of water soluble salts which have a stable molten anhydrous state at temperatures above the boiling points of their aqueous solutions in which a circulating melt of the fused salt is superheated to a temperature above the boiling point of the aqueous solution of the salt at which the fused salt is stable in a heating zone and passed to a mixing zone wherein an aqueous solution of the salt is added to the circulating melt of fused salt and from which mixing zone flashed steam is removed and cooled melt is withdrawn, the improvement which comprises distributing the superheated melt in the form of a shallow layer over a surface of relatively large area with the depth of the layer being sufficiently shallow to prevent below the surface of the melt the formation of steam produced by contacting the superheated melt with the aqueous salt solution, flowing the shallow stream in a serpentine path across said surface to a drain opening, and adding the said aqueous salt solution to the flowing shallow stream of melt in the mixing zone at a distance from the drain opening permitting intimate mixing and adequate dehydration time and in controlled amounts to provide substantial dehydration of the aqueous salt solution.

References Cited in the file of this patent
UNITED STATES PATENTS

| | | |
|---|---|---|
| 1,668,504 | Hammond | May 1, 1928 |
| 1,920,289 | Booth et al. | Aug. 1, 1933 |
| 1,937,757 | Gleason | Dec. 5, 1933 |
| 2,019,112 | Beekhuis | Oct. 29, 1935 |
| 2,022,037 | Hanchett | Nov. 26, 1935 |
| 2,161,964 | La Brecque | June 13, 1939 |
| 2,174,265 | Holt | Sept. 26, 1939 |
| 2,375,898 | Brujin et al. | May 15, 1945 |
| 2,528,407 | Yeandle | Oct. 31, 1950 |